United States Patent Office 3,582,383
Patented June 1, 1971

3,582,383
MODIFIED ZINC OXIDE COMPOSITION
Robert S. Bowman, Pittsburgh, Pa., assignor to St. Joseph Lead Company, New York, N.Y.
No Drawing. Filed June 13, 1968, Ser. No. 736,579
Int. Cl. C09c 1/04
U.S. Cl. 106—296                                                                                 4 Claims

ABSTRACT OF THE DISCLOSURE

The tendency of oil based paints containing lithiated zinc oxide pigment to body or gel on storage is destroyed by prior treatment of the pigment with carbon dioxide.

---

This invention relates to the preparation of modified zinc oxide composition useful in the preparation of oil based paints.

As taught in U.S. Patent 3,346,409 to Walrond, lithiated zinc oxides, preferably those containing 0.1–2.0% by weight of lithia, can be used in oil based paints without the undesirable blistering generally associated with the use of zinc oxide pigments. However, lithiated zinc oxides, particularly those containing higher concentrations of lithia, tend to cause an undesirable bodying or gelation of the paint on storage.

It is, therefore, a principal object of the present invention to provide a modified lithiated zinc oxide composition suitable for use as the pigment in blister resistant oil based paints free of any tendency to cause undesirable bodying or gelation of the paint on storage.

I have dscovered that the undesirable bodyng or gelation of oil based paints induced by the presence of lithiated zinc oxide pigment can be avoided by treating the pigment prior to formulation of the paint with carbon dioxide. Such treatment does not affect the anti-blister attributes of the lithiated pigment in the subsequent paint formulation.

More particularly, the process of the present invention comprises contacting lithiated zinc oxide containing 0.1–5.0% by weight of lithia with an atmosphere containing at least 1.0% by volume of carbon dioxide. The present invention also contemplates the carbonated lithiated zinc oxide pigment thereby produced and oil based paint compositions containing the carbonated pigment.

The tendency of paint to body or gel on storage is detected by periodically measuring its viscosity in a Stormer viscosimeter. Paint formulations prone to bodying will increase about 10 k.u. (Krebs units) in viscosity within 10–14 days. A Stormer reading of 140 k.u. is considered to reflect gelation.

A typical zinc oxide-pigmented oil based paint contains the following:

| Ingredient: | Pounds/100 gals. |
|---|---|
| Zinc oxide | 250 |
| Titanium dioxide (rutile) | 150 |
| Magnesium silicate | 386 |
| Raw linseed oil | 300 |
| Bodied linseed oil | 120 |
| Mineral spirits | 86 |
| 24% lead naphthenate drier | 12 |
| 6% manganese naphthenate drier | 2 |
| 6% cobalt naphthenate drier | 2 |
| Volatile oxime anti-skin agent (Exkin #2) | 1 |

The pigment volume is 33% and the Stormer viscosity 77–83 k.u.

The replacement of zinc oxide by lithiated zinc oxide (e.g., prepared by heating a dry admixture of zinc oxide and 3.0% by weight of lithium carbonate in air at 800° C. for 30 minutes) yielded a blister resistant paint. However, the paint bodied severely on storage as determined by an increase in its Stormer viscosity.

A similar paint formulated with another portion of the same lithiated zinc oxide but contacted for 10 minutes with a gas stream containing 50% by volume of carbon dioxide prior to formulation, showed no significant change in Stormer viscosity over a period of three months. It has been determined that gelation, if it is to occur on storage, will manifest itself well within three months.

The lithiated zinc oxide pigment can be contacted with carbon dioxide in a variety of ways. The most convenient procedure is to expose the pigment at room temperature to a carbon dioxide-containing atmosphere for a short period of time. Such treatment can be static; or the pigment may be fluidized in a gas stream containing carbon dioxide.

The undesirable tendency of untreated lithiated zinc oxide to promote bodying or gelling of oil based paints on storage is attributed to the presence of alkaline-reacting hydroxyl groups on the surface of the lithiated pigment. These hydroxyl groups are produced as the result of a side reaction when zinc oxide is lithiated by calcination. Treatment of the lithiated pigment according to the method of the present invention neutralizes by carbonation such surface hydroxyl groups. Thus, a suitable criterion that may be employed to establish that the carbon dioxide treatment will be effective for the intended purpose is the disappearance of surface hydroxyl groups.

The degree of surface hydroxylation present and the amount of carbon dioxide adsorbed during treatment was determined by vacuum desorption. Using this technique, samples of lithiated zinc oxide pigment were heated under vacuum at the constant rate of 7° C. per minute and the desorption peaks detected and measured. Prior to treatment, the pigment exhibited a strong hydroxyl peak at about 350° C., attributed to dehydration, and a modest carbon dioxide peak at about 700° C., attributed to the thermal decomposition of some lithium zincate carbonate and unreacted lithium carbonate. After carbonation according to the method of the present invention, the pigment samples exhibited minimal hydroxyl desorption peak and a quite larger carbon dioxide desorption peak. The pigments exhibiting a strong hydroxyl peak, when formulated into oil based paints, tended to cause bodying; whereas the treated pigments wherein the hydroxyl desorption peak had virtually disappeared did not possess this tendency.

The carbonation treatment most generally employed in these experiments was to contact a lithiated zinc oxide pigment containing up to 5% by weight of lithia for 10 minutes with a mixture containing equal volumes of carbon dioxide and air. Contrary to the results obtained with untreated controls, oil based paints prepared from the carbon dioxide-treated pigments did not exhibit undesirable bodying or gel on storage. Similar results were obtained when the carbon dioxide content of the air-carbon dioxide mixture was varied to contain from 1% by volume to essentially 100% carbon dioxide.

Other variations falling within the scope of the present invention will suggest themselves to those skilled in the art. My invention is not limited to the illustrative procedures specifically described or to any particular theoretical mode of operation but is as defined in the claims.

I claim:
1. The method of destroying the tendency of lithiated zinc oxide pigment to induce gelation in an oil based paint composition which comprises contacting the pigment with an atmosphere containing at least 1% by volume of carbon dioxide.
2. A method of treating lithiated zinc oxide pigment containing 0.1–5.0% by weight of lithia which comprises neutralizing the surface hydroxyls of the pigment with carbon dioxide.
3. A method according to claim 2 wherein the pigment was produced by calcining zinc oxide with lithium carbonate.
4. A non-gelling lithiated zinc oxide paint pigment produced by neutralizing the surface hydroxyls of lithiated zinc oxide pigment containing 0.1–5.0% by weight of lithia with carbon dioxide.

References Cited
UNITED STATES PATENTS

| | | | |
|---|---|---|---|
| 3,264,229 | 8/1966 | Klein | 106—296 |
| 3,346,409 | 10/1967 | Walrond | 106—296 |

JAMES E. POER, Primary Examiner